(No Model.)
C. M. STROBRIDGE & W. HOUGHTON.
MACHINE FOR SAWING SPOUTS.
No. 323,229. Patented July 28, 1885.
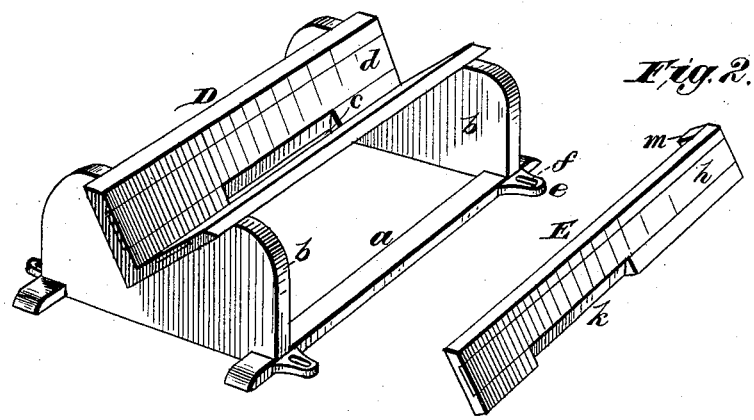
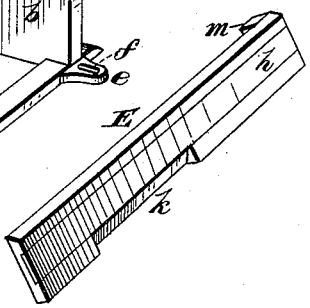
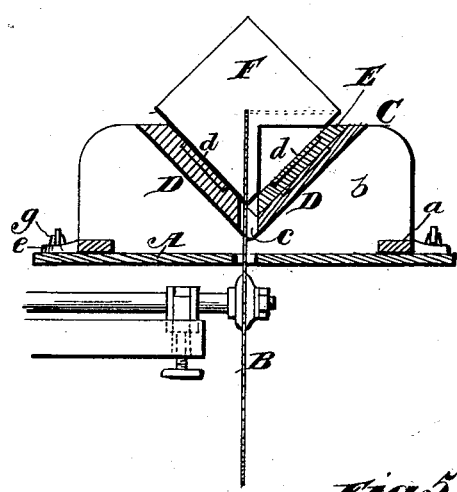
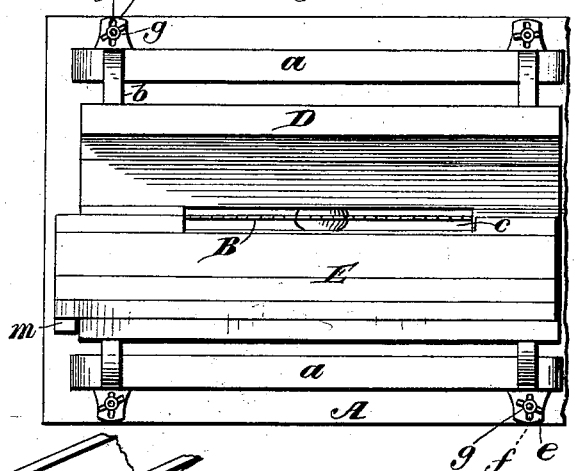
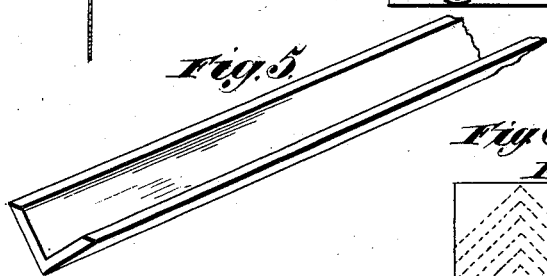
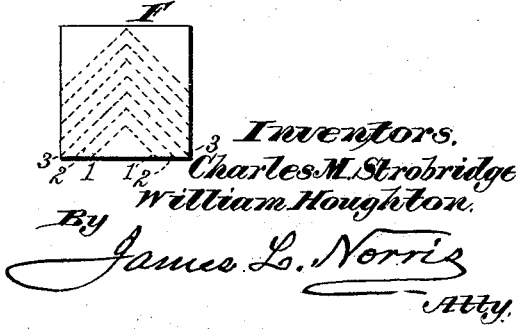
Witnesses.
Robert Emmett
J. A. Rutherford
Inventors.
Charles M. Strobridge
William Houghton.
By James L. Norris
Atty.
N. PETERS. Photo-Lithographer, Washington, D. C.

UNITED STATES PATENT OFFICE.

CHARLES M. STROBRIDGE AND WILLIAM HOUGHTON, OF MERRILL, WIS.

MACHINE FOR SAWING SPOUTS.

SPECIFICATION forming part of Letters Patent No. 323,229, dated July 28, 1885.

Application filed May 26, 1885. (No model.)

*To all whom it may concern:*

Be it known that we, CHARLES M. STROBRIDGE and WILLIAM HOUGHTON, citizens of the United States, residing at Merrill, in the county of Lincoln and State of Wisconsin, have invented new and useful Improvements in Machines for Sawing Wooden Spouts or Troughs, of which the following is a specification.

This invention relates to devices for supporting and guiding a squared piece of timber in an inclined position to the action of a vertical circular saw, whereby several V-shaped spouts or troughs will be sawed out of said timber by radial cuts.

The invention consists in the combination, with a saw-table and a circular saw mounted upon a vertically-adjustable arbor, of a vertically and laterally adjustable frame or guide having a V-shaped bed for supporting the stick of timber to be sawed, said guide-bed being slotted for the passage of the saw; and it also consists in the combination, with the guide-bed, of a series of removable slides having a thickness corresponding to that of the spouts or troughs to be sawed, whereby the timber is readily adjusted to the saw as each successive spout or trough is sawed out, and further in certain details of construction, as hereinafter set forth.

In the annexed drawings illustrating the invention, Figure 1 represents our improved device for supporting a piece of squared timber in an inclined or canted position to the action of a vertically-arranged circular saw. Fig. 2 is a view of one of the removable slides for adjusting the timber to the saw to correspond with the variation in size of each successive spout or trough. Fig. 3 is a sectional view of the saw-table and saw with timber support or guide in position. Fig. 4 is a plan view of same. Fig. 5 is a view of a spout or trough sawed out by the machine. Fig. 6 is a view of squared log, from which the trough is cut.

Like letters refer to like parts in the several views.

A designates an ordinary saw-table, and B a circular saw mounted therein in a vertical position upon an adjustable arbor, or an arbor journaled in vertically-adjustable bearings.

Upon the table A, and surrounding the saw B, is supported a vertically and laterally adjustable frame, C, consisting of the side bars, $a$ $a$, and end pieces, $b$ $b$. The end pieces, $b$ $b$, of the frame C are each formed at the top with a V-shaped notch for supporting one end of a V-shaped guide-bed, D, that in turn is adapted to support in a canted position the squared piece of timber from which the spouts or troughs are to be sawed.

In the bottom of the V-shaped bed D, at one side of the median line, is a longitudinal slot, $c$, for the passage of the saw.

The frame C and attached V-shaped bed D may be made of wood or metal, as desired. When made of wood the inner faces of the bed are preferably protected from wear by means of metallic strips or plates $d$ $d$, arranged longitudinally and secured by any suitable means.

On the lower part of the frame C, preferably at each corner, are lugs $e$ $e$, having slots $f$ $f$ for the passage of thumb-screws $g$ $g$, that engage similar slots in the saw-table, thereby permitting a lateral adjustment of the frame and guide-bed to bring the piece or block of timber into proper alignment with the saw. These thumb-screws may also have a sufficient length to admit of a vertical adjustment of the guide-bed.

The successive and uniform variation of the sizes of spouts or troughs to be cut radially from a squared log is gaged by means of several removable slides, E, the withdrawal of which, one after another, as each trough is cut, gradually enlarges the interior dimensions of the V-shaped guide-bed D, and correspondingly increases the depth of the cut of the saw for sawing out the succeeding trough. These movable slides E may be made entirely of wood or metal, or they may be formed of wood and be faced with metallic strips $h$ $h$ to prevent wear. Each slide E is cut away on its lower edge at $k$ to correspond with and form a continuation of the slot $c$ in the bottom of the guide-bed, and so avoid contact with the saw. The slides E are laid in an inclined position, one upon another, on one side of the V-shaped guide-bed D, and are held in place by cleats or stops *m* at one end, the stop on the lower slide being arranged to engage the end of the guide-bed, while the stop on each of the upper slides engages the end of the slide beneath. One, two, or more of these slides may be placed in the guide-bed at one time, according to the width and depth of trough to be sawed.

In sawing up a piece of timber that is uniformly squared, or having a cross-sectional area of, say, four by four, only two removable slides, E, about one inch thick will ordinarily be required. The slotted V-shaped guide-bed may be placed over any buzz-saw of suitable size. After the slides E are placed in position, as shown in Fig. 3, the squared log F is pushed in a canted or inclined position along the guide-bed and its slides toward the rotating saw B, the log being so presented that the saw will engage it at or within one of the corners, say, on the line 1, Fig. 6. After cutting the log radially on this line the log will be turned end for end and again brought to the saw, which will cut another radial kerf on a line that converges with the one first cut, thus removing from one side of the stick of timber a three-sided longitudinal core. This core or waste piece will be of greater or less thickness, of course, according to the number of slides E in the bed and the consequent depth of cut given by the saw. The upper slide, E, is now withdrawn to enable the log F to be presented to the saw on the lines 2 2, the log being turned end for end, as before, after one of the converging lines has been cut. The piece thus sawed from the log will form a perfect V-shaped trough or spout having a thickness about equal to that of the withdrawn slide. Another slide is now withdrawn, thereby enlarging the interior of the V-shaped bed and giving an increased depth of cut to the saw for removing or cutting from the log the succeeding trough, the outer sides of which are cut on the lines 3 3, in the manner before described. One V-shaped trough after another can thus be sawed from a squared log until it is almost entirely consumed, the only waste in addition to the core first removed being at the upper corners of the log. By raising or lowering the saws B or frame C and attached guide-bed D the size of the spout or trough to be sawed can be varied, as desired, while the lateral adjustment of the frame C enables the log to be readily brought into alignment with the saw.

It will be observed that the removable slides E E afford a convenient means of controlling the depth of the saw-cut and gaging the thickness of the trough to be sawed out.

Water-spouts and eaves-troughs of wood, as well as similar articles, are thus readily sawed from a log properly squared.

What we claim as our invention is—

1. In a machine for sawing wooden troughs, the combination of a frame composed of side and end pieces and provided with devices, substantially as described, for connecting it with the table of a circular saw, and a V-shaped guide-bed supported by the said frame and having its angular bottom portion provided with a longitudinal slot for the passage of a circular saw to cut troughs from the timber arranged in the guide-bed, as set forth.

2. In a machine for sawing out wooden troughs from a piece of squared timber, the combination of a saw-table, a circular saw mounted in said table, a vertically and laterally adjustable frame mounted on said saw-table and having a V-shaped guide-bed provided with a longitudinal slot, and a series of removable slides placed in said guide-bed and adapted to gage the depth of saw-cut and the thickness of the trough, substantially as described.

3. In a machine for sawing out wooden troughs from a piece of squared timber, the combination of a saw-table, a vertically-arranged circular saw, a V-shaped guide-bed adjustably mounted on the saw-table and provided with a longitudinal slot for the passage of the saw, and one or more movable slides for gaging the size of the trough, substantially as described.

In testimony whereof we have affixed our signatures in presence of two witnesses.

CHAS. M. STROBRIDGE.
WILLIAM HOUGHTON.

Witnesses:
 S. M. HOYT,
 ALMON A. HELMS.